(12) United States Patent
Medina Acosta et al.

(10) Patent No.: US 12,004,153 B2
(45) Date of Patent: Jun. 4, 2024

(54) SCHEDULING TRANSMISSIONS OVER PRECONFIGURED UPLINK RESOURCES

(71) Applicant: Telefonaktiebolaget LM Ericsson (publ), Stockholm (SE)

(72) Inventors: Gerardo Agni Medina Acosta, Märsta (SE); Andreas Höglund, Solna (SE); Yutao Sui, Solna (SE); Johan Bergman, Stockholm (SE); Emre Yavuz, Stockholm (SE); Sandeep Narayanan Kadan Veedu, Täby (SE); Hazhir Shokri Razaghi, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 510 days.

(21) Appl. No.: 17/288,291

(22) PCT Filed: Nov. 1, 2019

(86) PCT No.: PCT/EP2019/079972
§ 371 (c)(1),
(2) Date: Apr. 23, 2021

(87) PCT Pub. No.: WO2020/089457
PCT Pub. Date: May 7, 2020

(65) Prior Publication Data
US 2021/0385835 A1    Dec. 9, 2021

Related U.S. Application Data

(60) Provisional application No. 62/754,252, filed on Nov. 1, 2018.

(51) Int. Cl.
*H04W 72/23*     (2023.01)
*H04W 72/1268*   (2023.01)

(52) U.S. Cl.
CPC .............. *H04W 72/1268* (2013.01)

(58) Field of Classification Search
CPC ... H04W 72/23; H04W 72/1268; H04W 4/70; H04W 72/1215; H04L 5/0044; H04L 5/0012
See application file for complete search history.

(56) References Cited

U.S. PATENT DOCUMENTS

2016/0330791 A1* 11/2016 Vajapeyam .......... H04W 72/30
2019/0238219 A1*  8/2019 Liu ...................... H04W 4/70

FOREIGN PATENT DOCUMENTS

WO    2017078595 A1    5/2017

OTHER PUBLICATIONS

3GPP TSG RAN WG1 Meeting #94bis R1-1810051; Title: Final Report of 3GPP TSG RAN WG1 #94 v1.0.0 (Gothenburg, Sweden, Aug. 20-24, 2018); Source: MCC Support; Document for: Approval; Date and Location: Oct. 8-12, 2018, Chengdu, China, consisting of 194—pages.

(Continued)

*Primary Examiner* — Anez C Ebrahim
(74) *Attorney, Agent, or Firm* — Weisberg I.P. Law, P.A.

(57) ABSTRACT

A method, network nodes and wireless devices for scheduling transmissions over preconfigured uplink resources (PUR) are disclosed. According to one aspect, a method is performed by a network node for scheduling a plurality of wireless devices with periodic preconfigured uplink shared channel resources. The method includes configuring a wireless device of the plurality of wireless devices with preconfigured uplink resources, PURs, the PURs having a transmission length and a periodicity, the PURs being configured based at least in part on one or more multiplexing criteria for multiplexing the plurality of wireless devices for PUR transmission.

17 Claims, 13 Drawing Sheets

(56) References Cited

OTHER PUBLICATIONS

3GPP TSG RAN WG1 Meeting #95 R1-1812101; Title: Final Report of 3GPP TSG RAN WG1 #94bis v1.0.0 (Chengdu, China, Oct. 8-12, 2018); Source: MCC Support; Document for: Approval; Date and Location: Nov. 12-16, 2018, Spokane, USA, consisting of 197—pages.
3GPP TSG RAN WG1 Meeting #94bis; Title: RAN 1 Chairman's Notes; Oct. 8-12, 2018, Chengdu, China, consisting of 143—pages.
Canadian Office Action dated May 13, 2022 for Patent Application No. 3118385, consisting of 3—pages.
3GPP TSG RAN WG1 Meeting 94 R1-1809528; Title: LTE-M Preconfigured UL Resources Summary; Agenda Item: 6.2.1.2; Source: Sierra Wireless; Document for: Discussion and Decision; Date and Location: Aug. 20-24, 2018, Gothenburg, Sweden, consisting of 4—pages.
International Search Report and Written Opinion dated Jan. 30, 2020 for International Application No. PCT/EP2019/079972 filed Nov. 1, 2019, consisting of 14—pages.
3GPP TSG-RAN WG1 Meeting #94bis R1-1811736; Title: RAN1 agreements for Rel-16 Additional MTC Enhancements for LTE; Agenda Item: 6.2.1; Source: WI rapporteur (Ericsson); Document for: Information; Date and Location: Oct. 8-12, 2018, Chengdu, China, consisting of 10—pages.
3GPP TSG RAN Meeting #81 R1-181878; Title: Revised WID: Additional MTC enhancements for LTEE; Agenda Item: 10.7.1 Source: Ericsson; Document for: Approval; Date and Location: Sep. 10-13, 2018, Gold Coast, Australia, consisting of 4—pages.
3GPP TSG RAN meeting #81 R1-181674 (revision of RP-181451); Title: WID revision: Additional enhancements for NB-IoT; Agenda Item: 10.7.2; Source: Huawei; Document for: Approval; Date and Location: Sep. 10-13, 2018, Gold Coast, Australia, consisting of 4—pages.
Chinese Office Action and Search Report and English Summary dated Sep. 27, 2023 for Patent Application No. 201980087571.4, consisting of 8 pages.
3GPP TSG RAN WG1 Meeting #94bis R1-1810089; Title: UL transmission in preconfigured resource; Source: Huawei, HiSilicon; Agenda Item: 6.2.1.2; Document for: Discussion and decision; Location and Date: Chengdu, Oct. 8-12, 2018, consisting of 6 pages.

\* cited by examiner

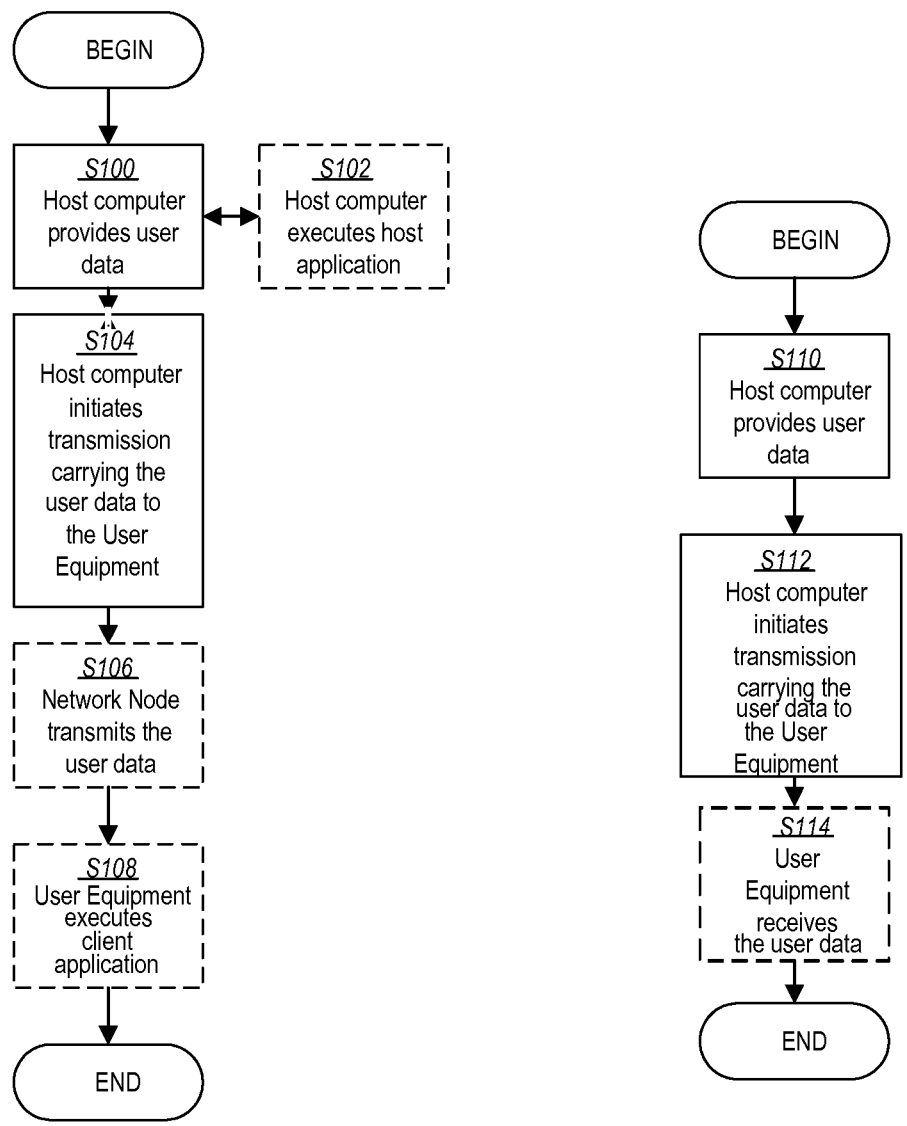

SCHEDULING TRANSMISSIONS OVER PRECONFIGURED UPLINK RESOURCES

CROSS-REFERENCE TO RELATED APPLICATIONS

This application is a Submission Under 35 U.S.C. § 371 for U.S. National Stage Patent Application of International Application No.: PCT/EP2019/079972, filed Nov. 1, 2019 entitled "SCHEDULING TRANSMISSIONS OVER PRECONFIGURED UPLINK RESOURCES," which claims priority to U.S. Provisional Application No.: 62/754,252, filed Nov. 1, 2018, entitled "SCHEDULING TRANSMISSIONS OVER PRECONFIGURED UPLINK RESOURCES IN MACHINE TYPE COMMUNICATIONS AND NARROW BAND INTERNET OF THINGS," the entireties of both of which are incorporated herein by reference.

TECHNICAL FIELD

The present disclosure relates to wireless communications, and in particular, to scheduling transmissions over preconfigured uplink resources (PURs).

BACKGROUND

Recent work on technical standards by the Third Generation Partnership Project (3GPP) provides objectives to improve transmission efficiency and/or wireless device power consumption. One objective is to specify support transmission in preconfigured resources in idle and/or connected mode based on single carrier frequency division multiple access (SC-FDMA) waveforms for wireless devices with a valid timing advance. Both shared resources and/or dedicated resources are contemplated.

The 3GPP has discussed use of PUR in Long Term Evolution (LTE) and New Radio (also called Fifth Generation (5G)). In some discussions, a dedicated preconfigured uplink (UL) resource is defined as a physical uplink shared channel (PUSCH) resource used by a single wireless device, where the PUSCH resource is a time-frequency resource and dedicated PURs are contention free. A contention-free shared (CFS) preconfigured uplink resource (CFS PUR) is defined as a PUSCH resource simultaneously used by more than one wireless device, where the PUSCH resource is at least a time-frequency resource and the CFS PUR is contention-free. A contention-based shared (CBS) preconfigured UL resource (CBS PUR) is defined as a PUSCH resource simultaneously used by more than one wireless device, where the PUSCH resource is at least a time-frequency resource and a CBS PUR is contention-based and which may require contention resolution.

In relation to these definitions, the following is assumed: in idle mode, dedicated preconfigured uplink resources are supported. In addition, PURs for transmission of data may be indicated by radio resource control (RRC) signaling. At least wireless device-specific RRC signaling may be supported. Further, for transmission in PUR, an RRC idle wireless device may use the latest timing advance (TA) that passed a validation criterion. A PUR framework according to the above assumptions is shown in FIG. 1. 3GPP has considered that in idle mode a dedicated PUR is supported. For transmission in preconfigured UL resources, an RRC idle user equipment may use the latest timing advance (TA) that passed validation criteria. The 3GPP has also considered that PUR for transmission of data are indicated by RRC signaling, where at least UE-specific RRC signaling is supported.

According to the above, the legacy connection establishment may be followed until the wireless device is in a radio resource control (RRC)-connected state in such a way that the wireless device can obtain the PUR configuration via wireless device-specific RRC signaling. Then, when the wireless device is back in the RRC-idle state, the wireless device can transmit on preconfigured UL resources if the latest timing advance (TA) the wireless device acquired passed some validation criteria so as to consider the TA valid. The validation criteria encompass some agreed-upon TA validation mechanisms, which are outside of the scope of this disclosure.

For a dedicated PUR scheme in idle mode, one typical use case corresponds to handling periodic data transmissions typically followed by inactivity (which may be seconds, minutes, hours, or even days). A problem is how to multiplex several wireless devices using preconfigured uplink resources and minimize (or at least reduce) the risk of collisions.

The problem of multiplexing multiple wireless devices using PUR may include handling wireless devices having uplink (UL) transmissions with the same or different durations (lengths), as well as wireless devices having the same or different transmission periodicities.

A related problem is, for the rather long PUR periodicities considered, how to indicate the PUR start position such that wireless device and network have a common understanding on a subframe level.

In order to make sure the wireless devices with the same or different transmission periodicities are arranged in a way that maximizes the resource usage, it is better to have as little gap as possible between two wireless devices in the time domain. However, currently, there is no efficient mechanism to achieve this, as wireless devices may need, e.g., different number of repetitions. In unicast, the scheduling can be handled dynamically via downlink control information (DCI) with respect to a reference signal, e.g., machine physical downlink control channel (MPDCCH), but as the PUR is pre-configured, an alternative mechanism is needed to indicate the starting point and/or the duration (length) of the PUR transmission.

SUMMARY

Some embodiments advantageously provide methods, network nodes and wireless devices for scheduling transmissions over preconfigured uplink resources (PUR) in machine type communications (MTC) and narrow band Internet of things (NB-IOT).

This disclosure describes methods for scheduling wireless devices that transmit periodically (with different or same transmissions and period lengths) over preconfigured uplink resources to minimize (or at least reduce) the risk of collisions and provide configuration flexibility, e.g., the possibility of using a single sub-carrier.

According to one aspect, a network node for scheduling a plurality of wireless devices with periodic preconfigured uplink shared channel resources is provided. The network node is configured to configure a wireless device of the plurality of wireless devices with PURs, the PURs having a transmission length and a periodicity, the PURs being configured based at least in part on one or more multiplexing criteria for multiplexing the plurality of wireless devices for PUR transmission.

According to this aspect, in some embodiments, the network node is further configured to indicate the starting subframe for the configured PUR. In some embodiments, the one or more multiplexing criteria includes determining the transmission length and periodicity of the PUR transmission for each wireless device of the plurality of wireless devices, grouping two or more of the wireless devices having PUR periodicities that are either the same periodicity or are different with each periodicity being a multiple of another periodicity, and allocating a unique starting subframe for a PUR transmission for each wireless device in the group of two or more wireless devices. In some embodiments, the network node is further configured to configure the group of two or more wireless devices on a subset of frequency resources. In some embodiments, the one or more multiplexing criteria includes determining the transmission length and periodicity of a PUR transmission for each wireless device of the plurality of wireless devices, grouping two or more of the wireless devices having the same PUR transmission length and PUR periodicity, and allocating the group of one or more wireless devices to the same multi user multiple input multiple output, MU-MIMO, beam or radio resources. In some embodiments, the wireless device configured with PUR has a periodicity derived from a set of PUR periodicities used by the network node which are multiples of a smallest PUR period. In some embodiments, the wireless device configured with PUR has a periodicity derived from a set of PUR periodicities used by the network node, the set of PUR periodicities occupying $2^n$ subframes, where n is an integer greater than 1. In some embodiments, the network node is further configured to provide hyperframe cycle information in a configuration of the PUR periodicity. In some embodiments, a PUR transmission length is a number of repetitions times a number of resource units. In some embodiments, the network node is further configured to multiplex scheduling of wireless devices that are configured with the same PUR transmission lengths and same PUR periods. In some embodiments, the network node is further configured to multiplex scheduling of wireless devices that are configured with different PUR transmission lengths but with same PUR periods. In some embodiments, the network node is further configured to multiplex scheduling of wireless devices that are configured with same PUR transmission lengths but with different PUR periods. In some embodiments, the network node is further configured to multiplex scheduling of wireless devices that are configured with different PUR transmission lengths and with different PUR periods.

According to another aspect, a method performed by a network node for scheduling a plurality of wireless devices includes configuring a wireless device of the plurality of wireless devices with preconfigured uplink resources, PURs, the PURs having a transmission length and a periodicity, the PURs being configured based at least in part on one or more multiplexing criteria for multiplexing the plurality of wireless devices for PUR transmission.

According to this aspect, in some embodiments, the method further includes indicating the starting subframe for the configured PUR. In some embodiments, the one or more multiplexing criteria comprises: determining the transmission length and periodicity of the PUR transmission for each wireless device of the plurality of wireless devices, grouping two or more of the wireless devices having PUR periodicities that are either the same periodicity or are different with each periodicity being a multiple of another periodicity, and allocating a unique starting subframe for a PUR transmission for each wireless device in the group of two or more wireless devices. In some embodiments, the network node is further configured to configure the group of two or more wireless devices on a subset of frequency resources. In some embodiments, the one or more multiplexing criteria comprises: determining the transmission length and periodicity of a PUR transmission for each wireless device of the plurality of wireless devices, grouping two or more of the wireless devices having the same PUR transmission length and PUR periodicity, and allocating the group of one or more wireless devices to the same multi user multiple input multiple output, MU-MIMO, beam or radio resources. In some embodiments, the wireless device configured PUR has a periodicity derived from a set of PUR periodicities used by the network node which are multiples of a smallest PUR period. In some embodiments, the wireless device configured with PUR has a periodicity derived from a set of PUR periodicities used by the network node, the set of PUR periodicities occupying $2^n$ subframes, where n is an integer greater than 1. In some embodiments, the network node is further configured to provide hyperframe cycle information in a configuration of the PUR periodicity. In some embodiments, a PUR transmission length is a number of repetitions times a number of resource units. In some embodiments, the network node is further configured to multiplex scheduling of wireless devices that are configured with the same PUR transmission lengths and same PUR periods. In some embodiments, the network node is further configured to multiplex scheduling of wireless devices that are configured with different PUR transmission lengths but with same PUR periods. In some embodiments, the network node is further configured to multiplex scheduling of wireless devices that are configured with same PUR transmission lengths but with different PUR periods. In some embodiments, the network node is further configured to multiplex scheduling of wireless devices that are configured with different PUR transmission lengths and with different PUR periods.

According to yet another aspect, a wireless device configured to communicate with a network node is provided. The wireless device is configured to: receive an indication of a pre-configured uplink resource, PUR, transmission length, PUR period and PUR start position, configure a physical uplink shared channel, PUSCH, transmission according to the indication of the PUR transmission length, PUR period and PUR start position, and transmit on a PUSCH on PURs having the indicated PUR transmission length, PUR period and PUR start position.

According to this aspect, in some embodiments, a length of a PUR period is a multiple of a smallest PUR periodicity. In some embodiments, the wireless device is further configured to receive hyperframe cycle information in a configuration of the PUR periodicity. In some embodiments, a PUR transmission length is a number of repetitions times a number of resource units.

According to another aspect, a method performed by a wireless device includes: receiving an indication of a pre-configured uplink resource, PUR, transmission length, PUR period and PUR start position, configuring a physical uplink shared channel, PUSCH, transmission according to the indication of PUR transmission length, PUR period and PUR start position, and transmitting on a PUSCH on PURs having the indicated PUR duty cycle, PUR period and PUR start position.

According to this aspect, in some embodiments, a length of a PUR period is a multiple of a smallest PUR periodicity. In some embodiments, the method includes receiving hyperframe cycle information in a configuration of the PUR periodicity. In some embodiments, a PUR transmission length is a number of repetitions times a number of resource units.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

Figure 1:
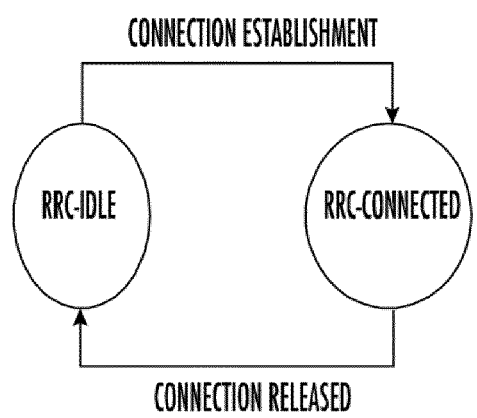
FIG. 1 is a diagram of a PUR framework according to some 3GPP agreements.

Before describing in detail exemplary embodiments, it is noted that the embodiments reside primarily in combinations of apparatus components and processing steps related to scheduling transmissions over preconfigured uplink resources (PUR) in machine type communications (MTC) and narrow band Internet of things (NB-IOT). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a UE or a radio network node.

In some embodiments, the non-limiting terms wireless device or a user equipment (UE) are used interchangeably. The wireless device herein can be any type of wireless device capable of communicating with a network node or another wireless device over radio signals, such as a UE. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

For scheduling periodic transmissions of several wireless devices on the preconfigured uplink resources (PUR), the following definitions are provided:
  "PUR Duty Cycle/PUR Transmission length" may encompass the total number of subframes (including resource unit (RU) length, number of allocated RUs, and number of repetitions) where the physical uplink shared channel (PUSCH) is present/active on the preconfigured uplink resources;
  "PUR periodicity" may encompass the total number of subframes where PUSCH is present/active plus the number of inactive subframes until the PUSCH transmission starts over; and
  "PUR starting subframe (offset)" may indicate the starting subframe, where the PUR transmission starts for a configured periodicity.

In some embodiments, the network node (e.g., eNodeB) may configure a "PUR Duty Cycle/PUR Transmission length" and "PUR periodicity" for each of the wireless devices that are intended to be multiplexed in a given PUR resource. The scheduling may be performed in such a way that the "PUR Duty Cycle/PUR Transmission length" of a given wireless device precedes the one of the next scheduled wireless device, and so on. In other words, the inactivity that follows the "PUR Duty Cycle/PUR Transmission length" of a given wireless device is occupied by the "PUR Duty Cycle/PUR Transmission length" of other wireless devices, and the cycle repeats. This can be also achieved by explicitly indicating the starting position (offset) of the PUR subframe of a wireless device.

Example methods for scheduling wireless devices that use PUR transmission include but are not limited to:
  Determining the transmission length of each wireless device that uses PUR transmission and determine the periodicity of each of the wireless devices that uses PUR transmission;
  Grouping wireless devices having the same "PUR periodicity", or different "PUR periodicities" if they are multiples of each other, then:
    a) Enabling PUR wireless device multiplexing by defining the possible 'PUR periodicity' values as a multiple of a base value, e.g., a power of 2 for 10*2n subframes.
  Defining the starting subframe, starting frame number (SFN), hyper frame number (HFN) for the "PUR Duty Cycle/PUR Transmission length" of each wireless device; and
    a) Potentially adding additional H-SFN bits to the PUR configuration to extend to time periods longer than 1048576 radio frames (~3 h);
  Optionally, making use of a sub-allocation of resources in the frequency domain and/or starting position in the time domain, for grouping wireless device with same "PUR periodicities" on each subset of frequency resources. From a set of 12 subcarriers, 4 subsets of 3 subcarriers are used to create time-frequency resources, where each subset is used for transmission over PUR with wireless devices having the same periodicity; and
    a) In each subset of resources, the wireless device can have different "PUR periodicities" if they are multiples of each other.

The methods for scheduling multiple wireless devices coexisting on PUR allow:
  Efficient resource allocation for wireless devices having UL transmissions with same or different lengths, as well as wireless devices having same or different transmission periodicities;
  For the avoidance of collisions and reduction of downlink (DL) resource fragmentation;
  The transmissions over PUR to be compatible with sub-PRB allocations in MTC, and single-tone and multi-tone allocations in NB-IoT;
  Transmission lengths to be handled to account for the RU length, a number of allocated RUs, and number of repetitions, which may be different for wireless devices multiplexed in PUR.
  The method for scheduling PUR transmissions to be extendable for a Contention Free Shared PUR scheme (CFS PUR) where a domain (e.g., code domain, spatial domain) other than the time-frequency domain is superimposed:
    a) In cases of multi user multiple input multiple output (MU-MIMO), wireless devices having the same "PUR Duty Cycle/PUR Transmission length" and "PUR periodicity" may be grouped for using a given beam or radio resources, and other groups with the same or different "PUR Duty Cycle/PUR Transmission length" and "PUR periodicity" may be used on other beams or other radio resources; and
    b) In cases of code division multiple access (CDMA), on top of the subset of time-frequency resources handling different "PUR Duty Cycle/PUR Transmission length" and "PUR periodicity", an orthogonal code may be used to create parallel subsets; and Scheduling wireless devices using a flexible timing framework that does not require absolute time or synchronization.

Figure 2:
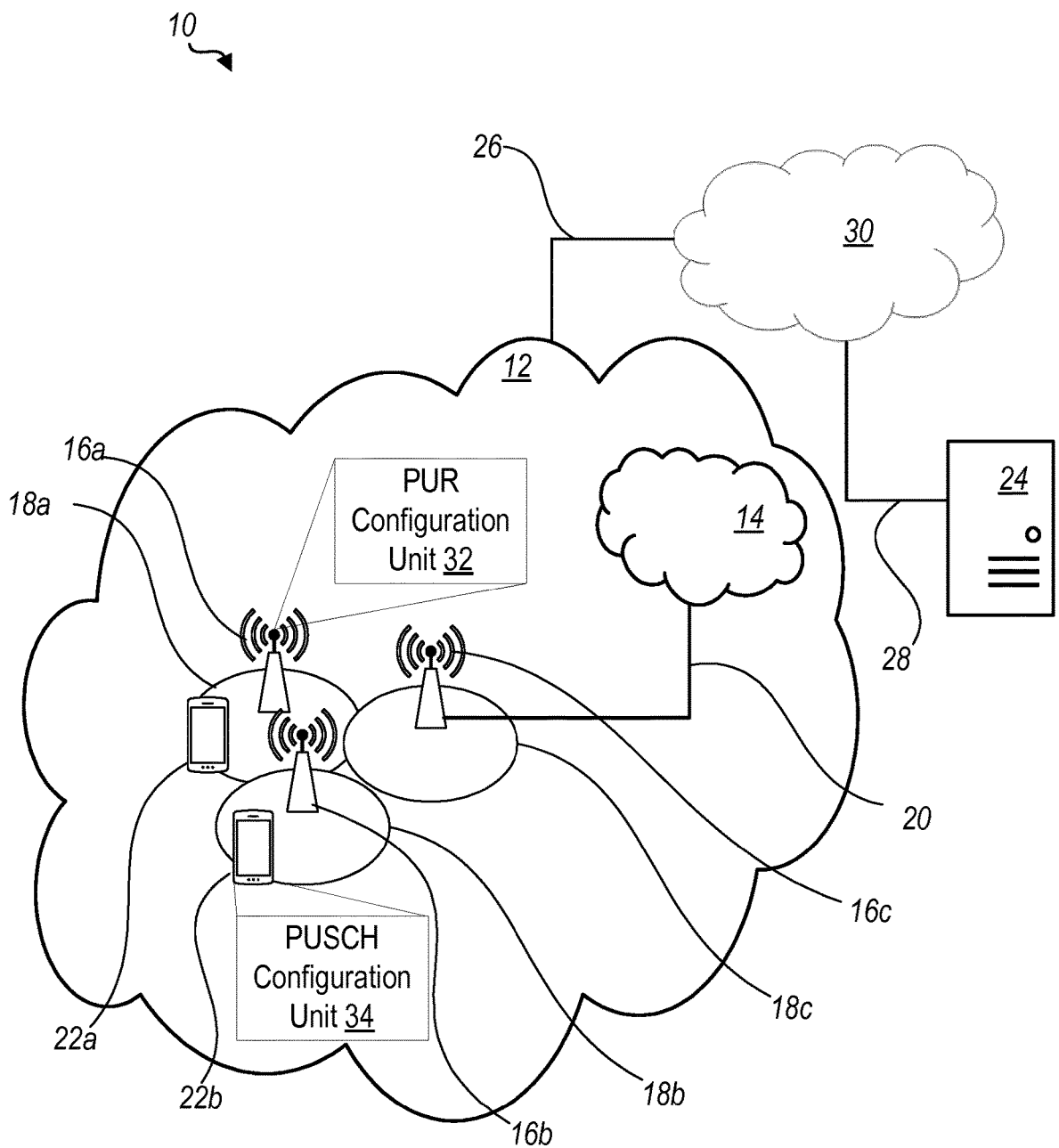
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16a. A second wireless device 22b in coverage area 18b is wirelessly connectable to the corresponding network node 16b. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole, enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a PUR Configuration Unit 32 which is configured to configure preconfigured uplink resources, PURs, the PURs having a transmission length and a periodicity for each of a plurality of wireless devices to be multiplexed. A wireless device is configured to include a PUSCH configuration unit 34 configured to configure a physical uplink shared channel, PUSCH, transmission according to the indication of PUR transmission length, PUR period and PUR start position.

Example implementations, in accordance with an embodiment, of the wireless device 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include PUR Configuration Unit 32 configured to configure a wireless device 22 with preconfigured uplink resources, PURs, the PURs having a transmission length and a periodicity for each of a plurality of wireless devices to be multiplexed.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 implements a PUSCH configuration unit 34 is configured to configure a physical uplink shared channel, PUSCH, transmission according to the indication of PUR transmission length, PUR period and PUR start position.

Figure 3:
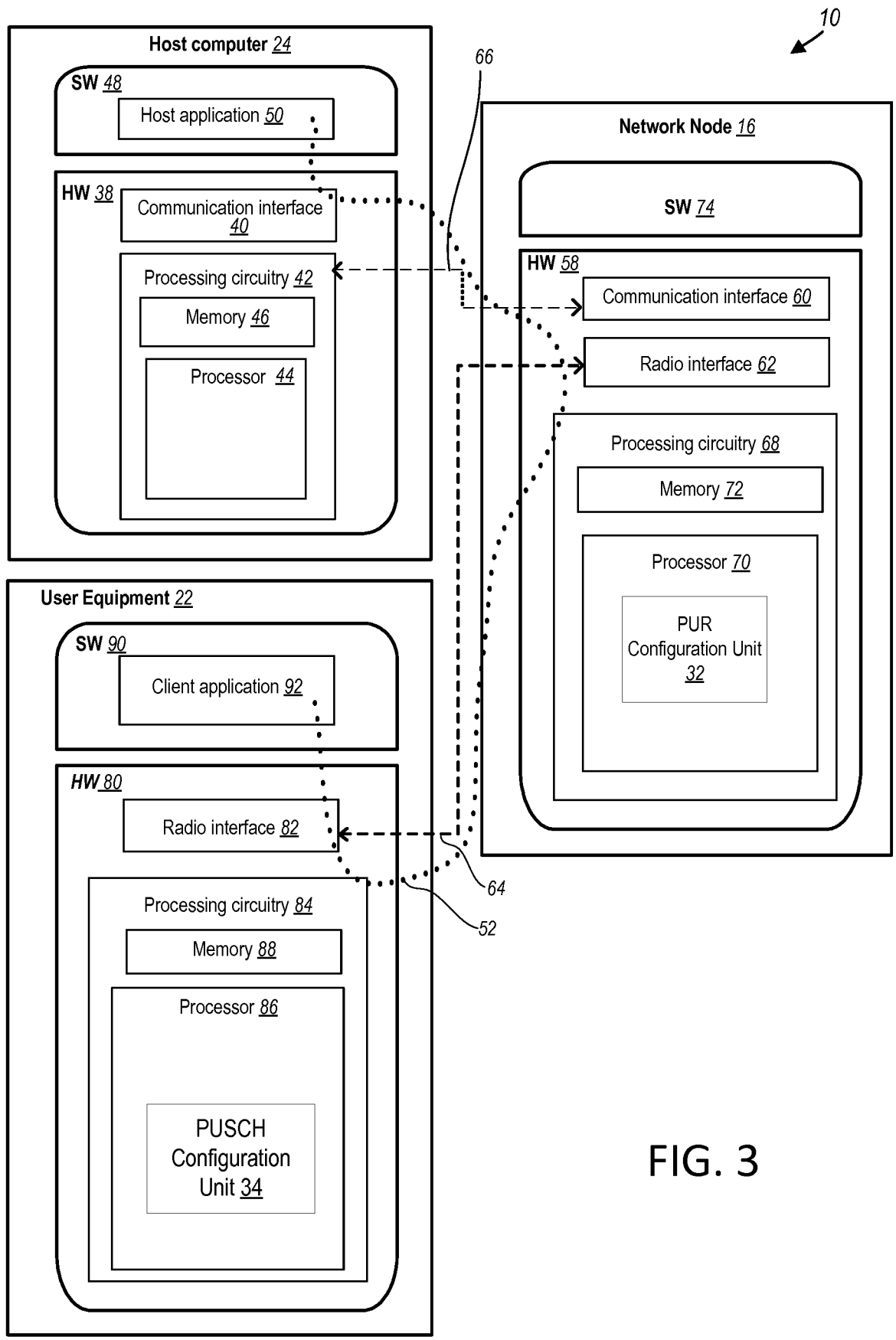
FIG. 3 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as PUR Configuration Unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a wireless device 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 114, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

Figure 6:
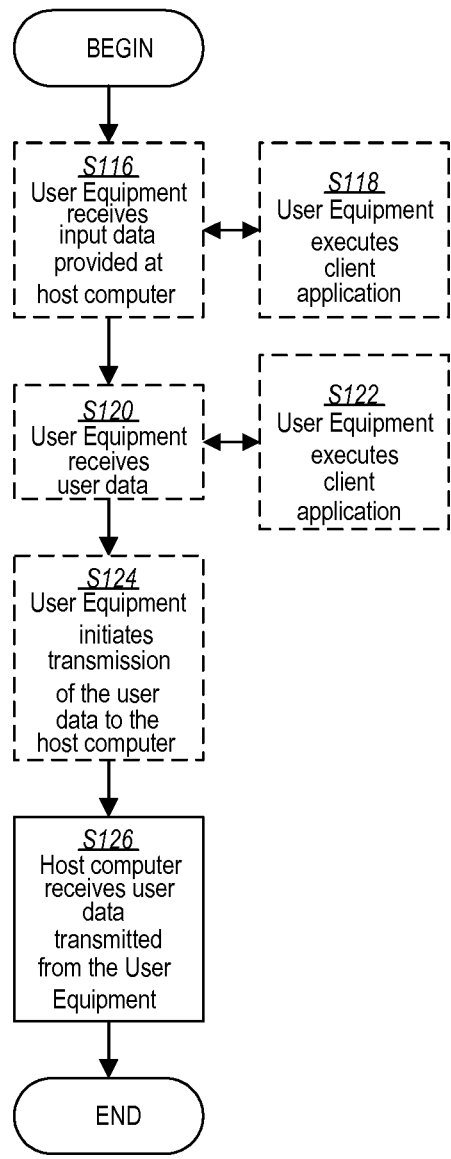
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In an optional first step of the method, the wireless device 22 receives input data provided by the host computer 24 (Block S116). In an optional substep of the first step, the wireless device 22 executes the client application 114, which provides the user data in reaction to the received input data provided by the host computer 24 (Block S118). Additionally, or alternatively, in an optional second step, the wireless device 22 provides user data (Block S120). In an optional substep of the second step, the wireless device provides the user data by executing a client application, such as, for example, client application 114 (Block S122). In providing the user data, the executed client application 114 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

Figure 7:
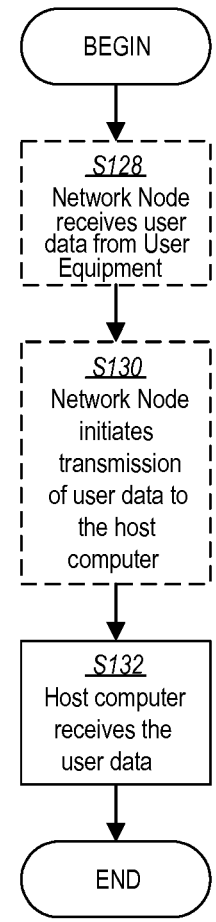
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
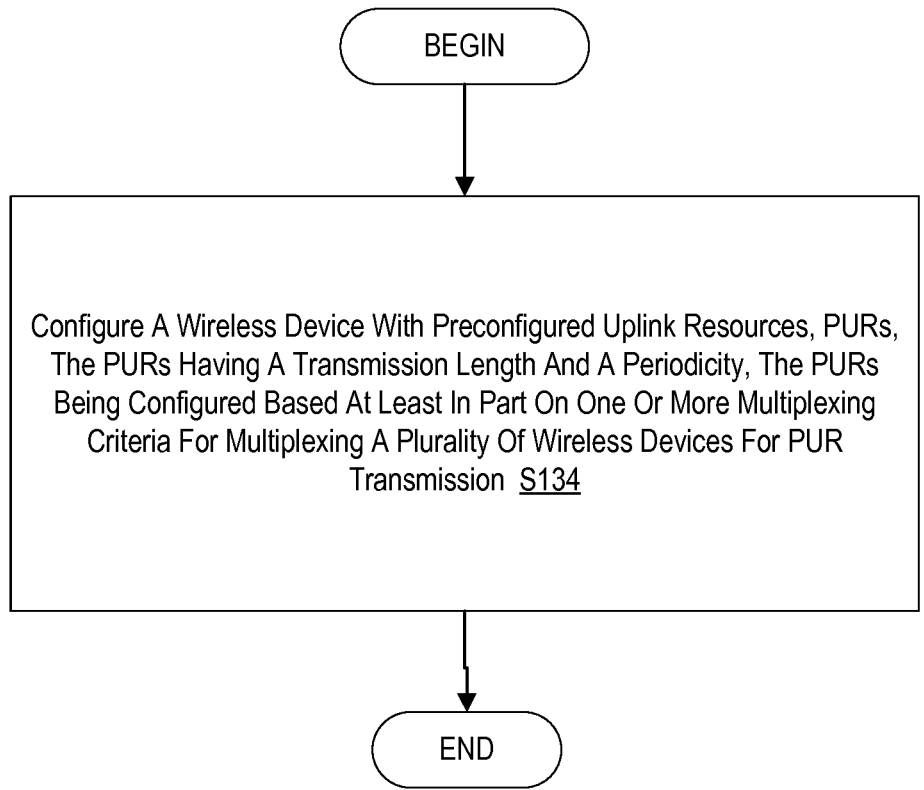
FIG. 8 is a flowchart of an exemplary process in a network node for scheduling transmissions over preconfigured uplink resources (PURs) according to some embodiments of the present disclosure.

FIG. 8 is a flowchart of an exemplary process in a network node 16 according to principles set forth herein. One or more blocks described herein may be performed by one or more elements of network node 16 such as by one or more of processing circuitry 68 (including the PUR configuration unit 32), processor 70, radio interface 62 and/or communication interface 60. Network node 16 such as via processing circuitry 68 and/or processor 70 and/or radio interface 62 and/or communication interface 60 is configured to configure, such as via the PUR Configuration Unit 32, a wireless device 22 of a plurality of wireless devices 22 with preconfigured uplink resources, PURs, the PURs having a transmission length and a periodicity, the PURs being configured based at least in part on one or more multiplexing criteria for multiplexing the plurality of wireless devices 22 for PUR transmission (Block S134).

Figure 9:
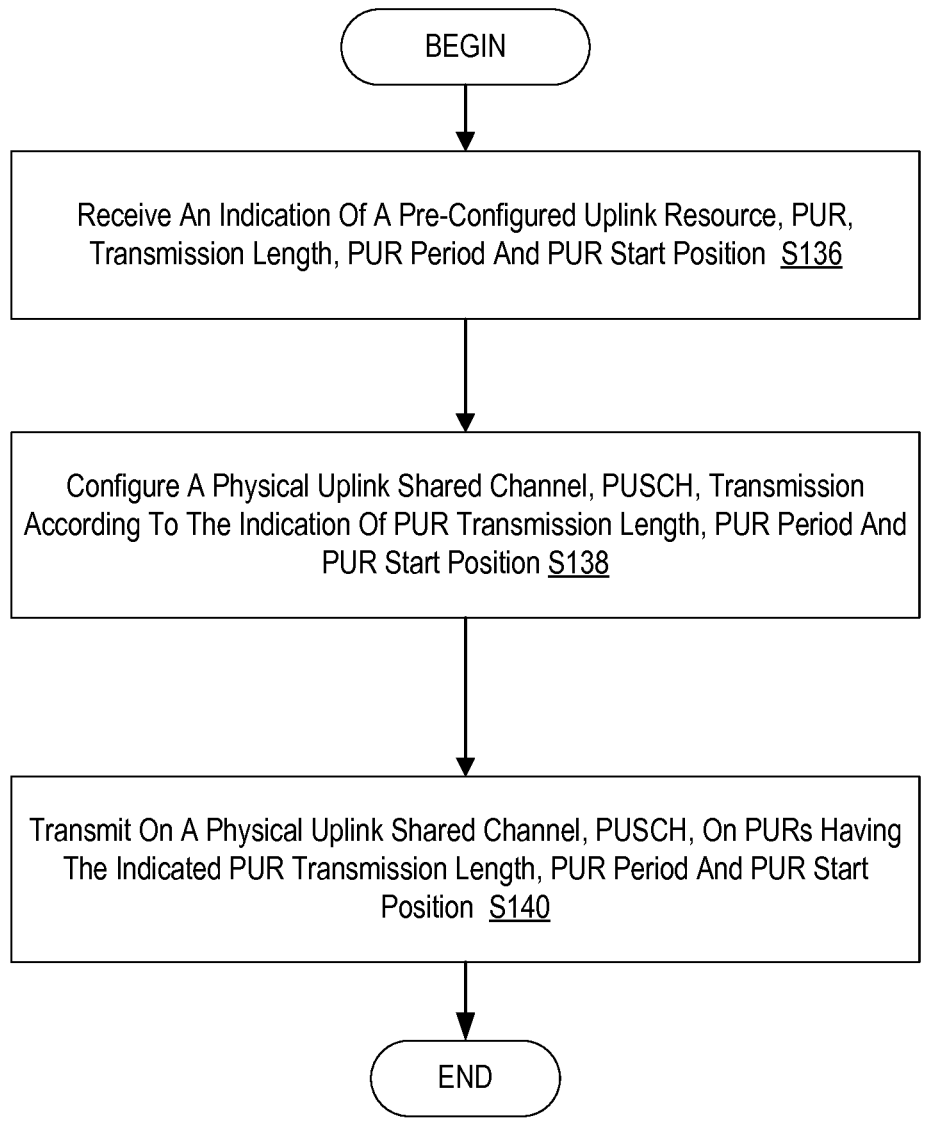
FIG. 9 is a flowchart of an exemplary process in a wireless device for scheduling transmissions over PURs according to some embodiments of the present disclosure.

FIG. 9 is a flowchart of an exemplary process in a wireless device 22 according to some embodiments of the present disclosure. One or more blocks described herein may be performed by one or more elements of wireless device 22 such as by one or more of processing circuitry 84 (including the PUSCH configuration unit 34), processor 86, radio interface 82 and/or communication interface 60. Wireless device 22 such as via processing circuitry 84 and/or processor 86 and/or radio interface 82 is configured to receive, via the radio interface 82, an indication of a pre-configured uplink resource, PUR, transmission length PUR period and PUR start position (Block S136). The process also includes configuring a physical uplink shared channel, PUSCH, transmission according to the indication of PUR transmission length, PUR period and PUR start position (Block S138). The process also includes transmitting, via the radio interface 82, on a physical uplink shared channel, PUSCH, on PURs having the indicated PUR transmission length, PUR period and PUR start position (Block S140).

Having described the general process flow of arrangements of the disclosure and having provided examples of hardware and software arrangements for implementing the processes and functions of the disclosure, the sections below provide details and examples of arrangements for scheduling transmissions over preconfigured uplink resources (PUR) in machine type communications (MTC) and narrow band Internet of things (NB-IOT).

According to the definitions discussed above, and as described in standards documents such as RAN1 #94bis, a dedicated preconfigured UL resource may be defined as a PUSCH resource used by a single wireless device 22. In addition, as part of the definitions it is noted that PUSCH resource may be a time-frequency resource and the dedicated PUR may be contention-free. The subsections below elaborate on the "time-frequency resource" for the dedicated PUR.

Time-Frequency domain resources allocation for multiple wireless devices in PUR (detailed problem descriptions)

Figure 10:
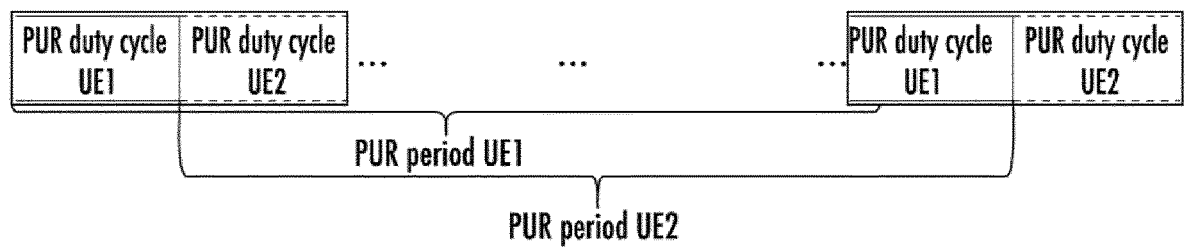
FIG. 10 is a diagram of a PUR duty cycle/transmission length and PUR period for 2 wireless devices.

Dedicated PUR is in principle intended to assess deterministic transmissions; that is, data transmission occupying a number of subframes followed by inactivity encompassing normally a larger number of subframes until the next period is reached to start over. In other words, a transmission over pre-configured uplink resources is essentially composed of a "PUR duty cycle/PUR Transmission length" and "PUR period" as depicted in FIG. 10. FIG. 10 shows the PUR period for 2 wireless devices 22, UE1 and UE2.

The "PUR duty cycle" (transmission length) and the "PUR period" mainly depend on the data traffic characteristic and the coverage location of the wireless device 22. For example, a wireless device 22 that transmits every six hours which, due to its coverage conditions may require performing 32 repetitions, will have a "PUR duty cycle" (transmission length) encompassing the total number of subframes conforming to the 32 repetitions (i.e., accounting for the number, if any, of allocated RUs, RU lengths, and number of repetitions). Meanwhile, the "PUR period" may encompass the number of subframes associated with the wireless device's periodicity (e.g., a device periodicity of six hours encompasses 21,600,000 subframes). The "PUR start position" is further defined as the start of the "PUR duty cycle" (transmission length). As described below, in some embodiments, 20 system frame number (SFN) bits could be used for pointing out the radio frame of the 'PUR start position' and e.g., 4 bits to point out the starting subframe. (Note that a 10-bit bitmap is not required since the 'PUR start position' can only be in one subframe.). The subframe signaling bits can further be reduced if some of the subframes can be excluded as starting subframes, e.g., if two subframes can be excluded, then 3 subframe bits would be sufficient.

Figure 11:
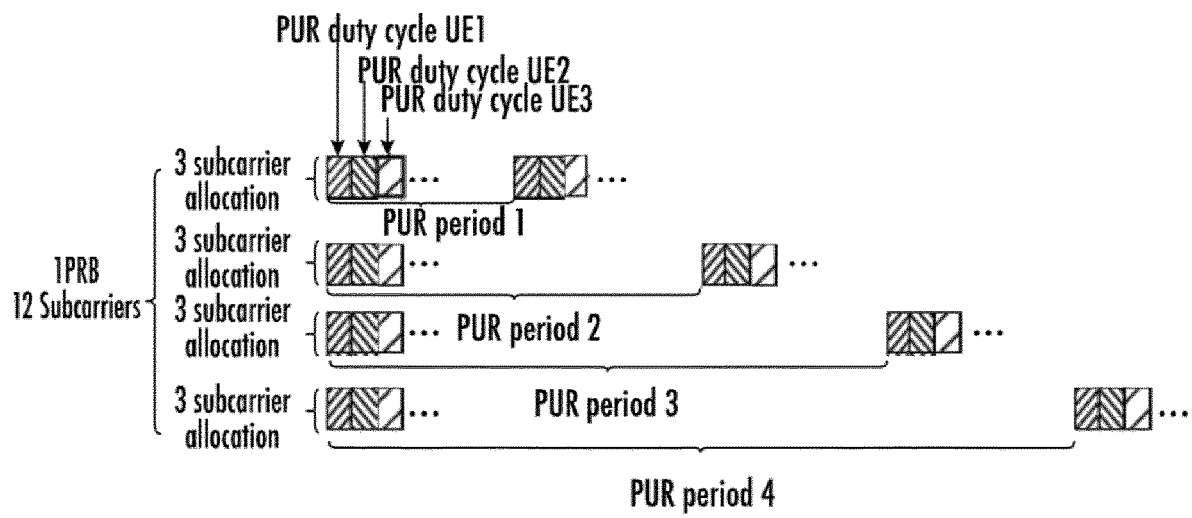
FIG. 11 illustrates grouping of wireless devices having same periodicities.

The fundamental utilization of resources in the time domain for performing transmissions over PUR are described above. In terms of the frequency domain, different wireless devices 22 can be multiplexed in the frequency domain by using different frequencies. Using NB-IoT as an example, single-tone and/or multi-tone allocations can be used to multiplex different wireless devices 22 at the same time in the frequency domain. A non-limiting example is shown in FIG. 11 for three wireless devices 22, namely UE1, UE2 and UE3. (Note that for NB-IoT allocation support, transmission over one subcarrier is provided, whereas long term evolution machine (LTE-M) supports transmission over a minimum of 3 subcarriers.)

In the example depicted in FIG. 11, for each allocation consisting of 3 subcarriers, wireless devices 22 having the same periodicities have been grouped. Mixing periodicities is also possible. Moreover, to prevent a potential waste of resources, a PUR retrieve resource timer can be considered, which can be configured as a number of PUR periods that have to pass with no activity for it to expire. Once expired, the PUR resources are retrieved by the network so they can be used by other wireless devices 22 (a PUR may be considered as deactivated if the PUR retrieve resource timer has expired).

Multiplexing of PUR Wireless Devices

Four different cases are described relating to whether the wireless devices 22 have the same transmission length and/or they have the same transmission periodicity. Non-exclusive examples and detailed descriptions are given below.

In order to schedule the wireless devices 22 efficiently, in some embodiments, the PUR periodicity is introduced, e.g., subframes for radio frames, and the numbers in the set of PUR periodicities are multiples of the smallest PUR period. As a non-exclusive example, the set of PUR periodicities can be defined as a $2^n$ subframes, where n is a set of integers that is larger than 1. Then a set of PUR periodicities such as {128, 256, 512, 1024, 2048} subframes may be configured via for example the processing circuitry 68. Depending on the wireless device 22 traffic, the network node 16 can signal particular values from the set for the wireless device 22 to use as its PUR periodicity.

In one embodiment, a basic length of a PUR period (or a set of basic lengths of a PUR period) is defined. Then, the actual PUR periodicity is calculated based on the chosen basic length of a PUR period, which is a multiple of the chosen basic PUR periodicity. For example, if the basic length of a PUR period is M, then the PUR periodicity that can be chosen are from a set of {M, 2M, 3M, 4M, 5M, 6M} or {M, 2M, 4M, 8M, 16M . . . } Depending on the wireless device 22 traffic, the network can signal one particular value from the set for the wireless device 22 to use as its PUR periodicity.

In one embodiment, the network node 16 can include hyperframe cycle information in a configuration of the PUR periodicity. In one embodiment, the network node 16 can include hyperframe cycle information that is extended as part of the configuration for PUR periodicity.

In some embodiments, the PUR starting subframe is signaled via for example the radio interface 62 explicitly in terms of the absolute subframe (or the absolute slot in case 3.75 kHz is used in NB-IoT UL) indicating in which radio frame and in which hyperframe frame the PUR starting subframe is located.

In one embodiment, the network node 16 configures, via for example the processing circuitry 68, the PUR transmission length for a wireless device 22 in terms of the number of repetitions of the RUs to where the wireless device's configured transport block (TB) is mapped. For example, if a TB is mapped to 10 RUs, and the number of repetitions is 32, then the total length of the transmission is 32*10=320 RUs. The length of the RU depends on the number of subcarriers allocated.

In one embodiment, the network node 16 determines, via for example the processing circuitry 68, the starting point of the PUR transmission of a wireless device 22 based on some factors related to other wireless devices 22 that are allocated PUR resources which may or may not be in the same period. In one embodiment, the network can include the sub-carrier as part of the configuration for PUR periodicity. In another embodiment, multiple sub-carriers can be included for such configuration. In total there may be four different cases relating to whether the wireless devices 22 have the same transmission length and/or whether they have the same transmission periodicity.

Figure 12:
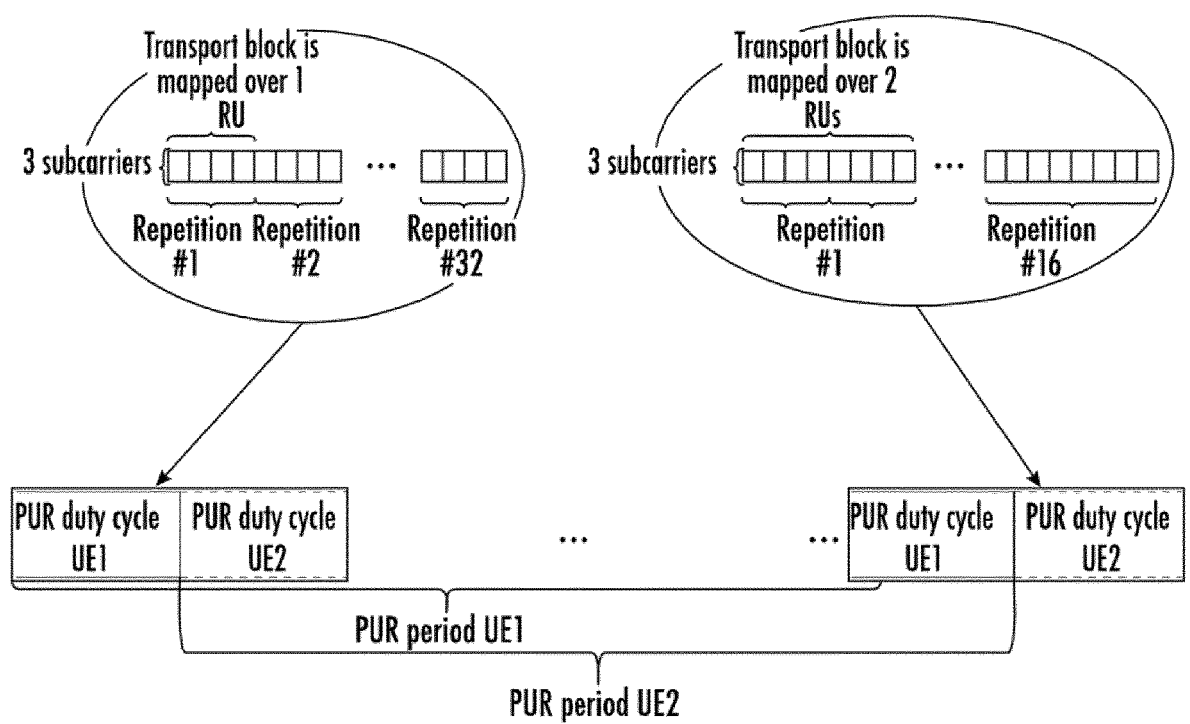
FIG. 12 illustrates PUR duty cycles remaining the same when information provided to the wireless device as part of the uplink grant is different.

Wireless Devices Having a Same Transmission Length and the Same Transmission Periodicity Several wireless devices 22 can be multiplexed without risk of collision if they are configured with the same PUR transmission lengths and same PUR periods. Note that the PUR transmission lengths can remain the same even if the information provided to the wireless device 22 as part of the UL grant (i.e., number of allocated subcarriers, number of allocated RUs, number of repetitions) is different, as illustrated in FIG. 12. FIG. 12 shows a duty cycle for a wireless device, UE1, having 32 repetitions, 3 allocated subcarriers, and 1 resource unit and also shows a duty cycle for a wireless device, UE2, having 16 repetitions, 3 allocated subcarriers and 2 resource units.

This method of grouping wireless devices 22 having the same "PUR period" and "PUR periodicity" reduces the scheduler complexity and is free of collisions. For example, assuming that in a given "time-frequency" resource, all wireless devices 22 have the same periodicity, where the scheduling of every subsequent wireless device 22 depends on the starting point and "PUR duty cycle" of the previous one, the scheduling of the first two wireless devices 22 would be as follows:

UE1:
a) PUR_Duty_Cycle=128 subframes (can be 128 ms). Note that the 128 subframes should account for the RU length, number of allocated RUs, and number of repeats;
b) PUR_period=Device_Periodicity_in_ms;
c) Starting_Subframe: e.g., #0;
d) Starting_SFN: e.g., #0; and/or
e) Starting_HFN: e.g., #0.

UE2:
a) PUR_Duty_Cycle=128 subframes (can be seen as 128 ms). Note that the 128 subframes account for the RU length, number of allocated RUs, and number of repeats;
b) PUR_period=Device_Periodicity_in_ms;
c) Starting_Subframe:
   mod(Starting_subframeUE1+PUR_Duty_Cycle_UE1, 10). Note that the starting point of UE2 depends on what was the starting subframe and PUR_Duty_Cycle of UE1;
d) Starting_SFN: mod(floor(Starting_Subframe +PURDuty_Cycle_UE1)/10),1024); and/or
e) Starting_HFN: if Starting_SFN/1024==1, HFN++.

Moreover, the frequency domain can be divided in subsets of subcarriers to assign different groups of wireless devices 22 having the same "PUR period" and "PUR periodicity", on each set of subcarriers as depicted in FIG. 11.

Note that a wireless device 22 may not be concerned with keeping track of Duty Cycle (transmission length), PUR period, etc., of other wireless devices 22. The wireless device 22 would only need to be informed about its own PUR start position, PUR period (optional), and PUR grant. This is also the signaling part that may be specified. All the complexity of keeping track of all wireless devices 22 may be up to network implementation and a problem for the scheduler.

Figure 13:
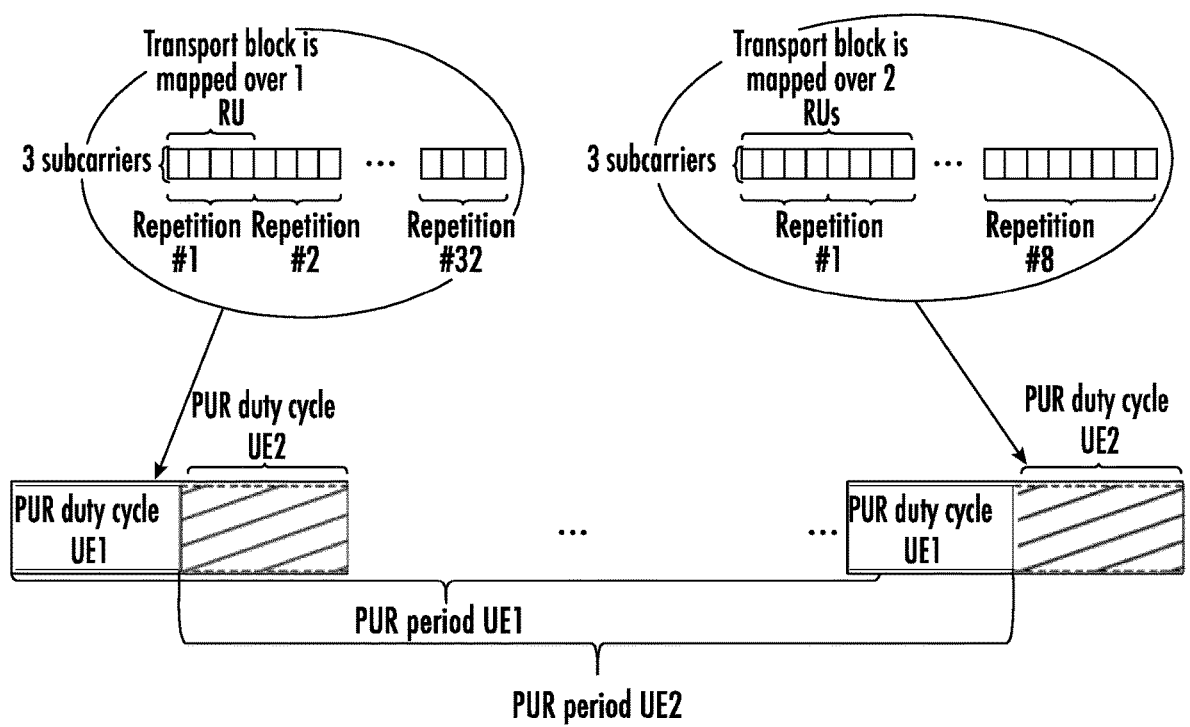
FIG. 13 illustrates wireless devices configured with different PUR duty cycles but same PUR periods.

Wireless Devices Having Different Transmission Length and Having the Same Transmission Periodicity Several wireless devices 22 can be multiplexed without risk of collision if they are configured with different PUR transmission lengths but the same PUR periods, as depicted in FIG. 13. FIG. 13 shows a duty cycle for a wireless device, UE1, having 32 repetitions, 3 allocated subcarriers, and 1 resource unit and also shows a duty cycle for a wireless device. UE2, having 8 repetitions, 3 allocated subcarriers and 2 resource units.

Figure 14:
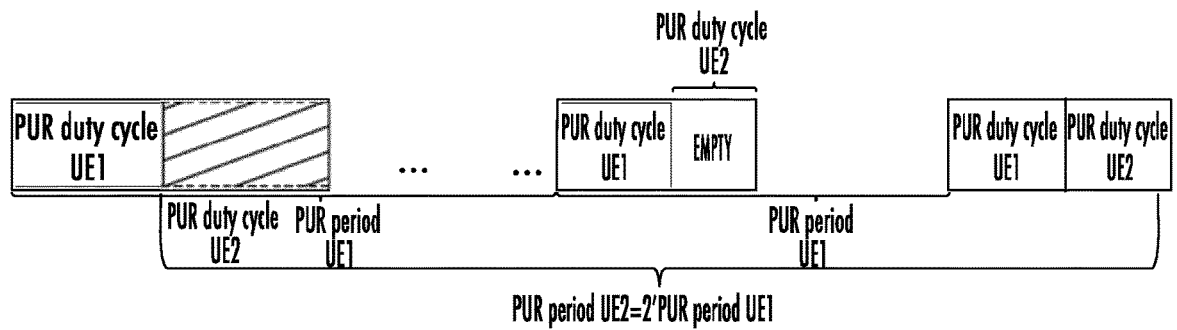
FIG. 14 illustrates a case where wireless devices have a same transmission length but with different transmission periodicities.

Wireless Devices Having a Same Transmission Length and Having Different Transmission Periodicities Several wireless devices 22 can be multiplexed without risk of collision if they are configured with same PUR transmission lengths and different PUR periods as long as the PUR period of the new scheduled wireless device 22 has a longer length that is a multiple of previously scheduled PUR periods. FIG. 14 illustrates a case where wireless devices 22 having a same transmission length and have different transmission periodicities.

Figure 15:
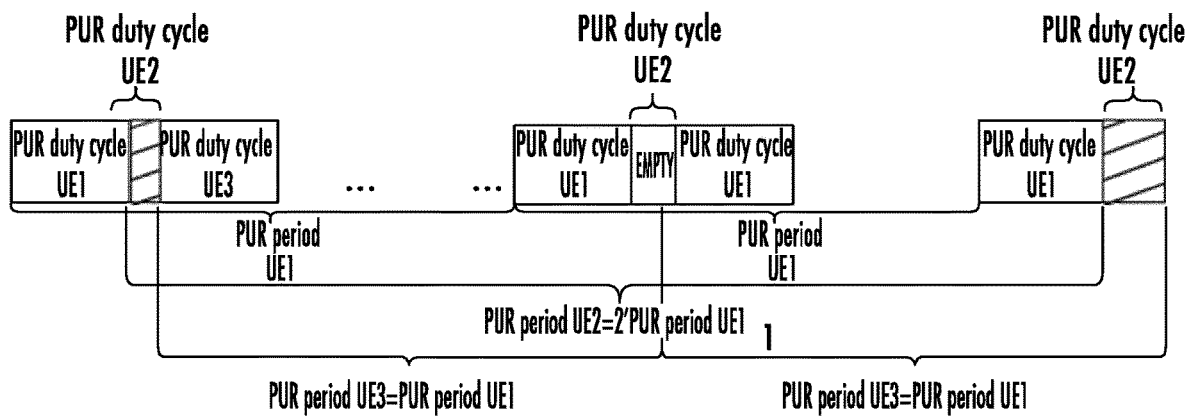
FIG. 15 illustrates wireless devices having different PUR transmission lengths and different PUR periods.

Wireless Devices Having Different Transmission Lengths and Having Different Transmission Periodicity Similarly, several wireless devices 22 can coexist without risk of collision if they are configured with different PUR transmission lengths and different PUR periods as long as the "PUR period" of the new scheduled wireless device 22 has a longer length that is a multiple of previously scheduled "PUR periods", as illustrated in FIG. 15.

Requirement on PUR Periodicity

Figure 16:
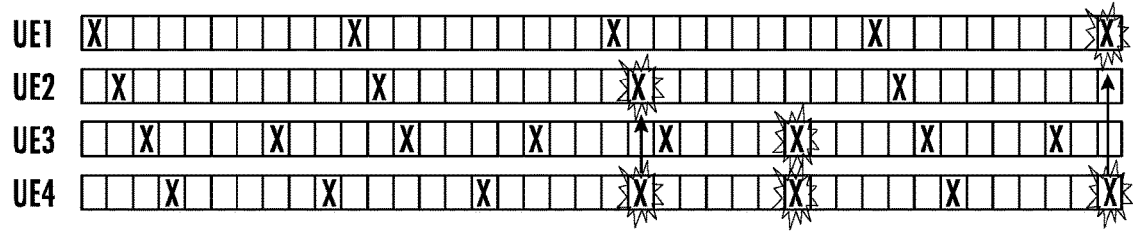
FIG. 16 illustrates wireless devices having different PUR periodicities that are multiples of one another.

As described above, there may be some requirements on the PUR periodicity in order to multiplex PUR wireless devices 22 in the same carrier. In general, if the periodicities are different for different wireless devices 22 they may be chosen to be multiples of each other so as not to collide eventually. This is illustrated in FIG. 16.

In one embodiment, the PUR periodicity is expressed as a power of 2 to ensure that wireless devices 22 with different PUR periodicities can be multiplexed without risk of collision. For example, the PUR period can be specified to be $10*2^n$ subframes. A further example of the range based on the power of 2 is given in Table 1 below.

TABLE 1

Example of PUR periodicity range.

| SFN: | | | | | | | | | |
|---|---|---|---|---|---|---|---|---|---|
| 2 | 4 | 8 | 16 | 32 | 64 | 128 | 256 | 512 | 1024 |

| Time: | 0.02 s | 0.04 s | 0.08 s | 0.16 s | 0.32 s | 0.64 s | 1.28 s | 2.5 s | 5 s | 10 s |

| SFN: | | | | | | | | | |
|---|---|---|---|---|---|---|---|---|---|
| 2048 | 4096 | 8192 | 16384 | 32768 | 65536 | 131072 | 262144 | 524288 | 1048576 |

| Time: | 20 s | 41 s | 1.4 min | 2.7 min | 5.5 min | 11 min | 22 min | 43 min | 1.5 h | 3 h |

In one embodiment, the range of the PUR periodicity, and also the PUR start position, is extended beyond the 1,048,576 radio frames (~3 h) provided by the SFN plus hyper-SFN (H-SFN) (20 bits in total) by the introduction of additional PUR H-SFN bits. These may not have to be broadcasted in system information but can be kept track of at the network side and communicated to the wireless device 22 as part of the PUR configuration. For example, 3 additional PUR H-SFN bits would extend the configurable time period to ~24 h.

Figure 17:
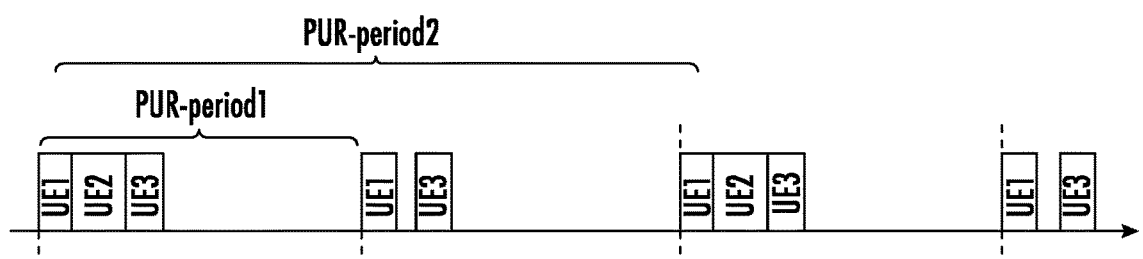
FIG. 17 shows that wireless devices can be multiplexed in a same carrier even though they have different duty cycles (transmission lengths) and PUR periods.

If the PUR period is configured in this manner it may be ensured that there will be no collisions among PUR wireless devices 22. This is illustrated in FIG. 17 where it is seen that even though the Duty Cycles (transmission lengths) and PUR periods are different, wireless devices 22 can still be multiplexed in the same carrier without risk of collision.

This may be ensured by having 1) unique PUR start positions and 2) quantized PUR periodicity as of above. (In FIG. 17, note that in the "unused" resources by UE2, the scheduler can multiplex a fourth wireless device, UE4 with the same periodicity as UE2 but with a start position offset by 'PUR-period1').

When scheduling wireless devices 22 in this manner there may be however a requirement that should be fulfilled. Specifically, it should be ensured that the shortest PUR period in use is larger than the total transmission time (sum of Duty Cycles) of all the scheduled PUR wireless devices 22 in the carrier. This is to ensure that the wireless device 22 with the shorter PUR periodicity is not colliding with transmissions offset from the starting point.

Note that there can be two versions of PUR transmission: periodic PUR and per-request PUR. The latter is configured only for one PUR resource/transmission occasion at the time and therefore the PUR periodicity would not be part of the PUR configuration in this case. Therefore, the PUR periodicity information element could be optional in the specification.

In an alternative embodiment, the subframe is not signaled but instead hard-coded in the specification. That is, time periods are signaled in terms of radio frames and it may be specified that, e.g., the transmission starts in the first valid subframe of the radio frame.

Although the above description is described for uplink PUR transmission, some embodiments are equally applicable to downlink (DL) PUR transmissions.

According to one aspect, a network node 16 for scheduling a plurality of wireless devices 22 with periodic preconfigured uplink shared channel resources is provided. The network node 16 is configured to configure, via the processing circuitry 68, which may include PUR configuration unit 32, a wireless device 22 of the plurality of wireless devices 22 with PURs, the PURs having a transmission length and a periodicity, the PURs being configured based at least in part on one or more multiplexing criteria for multiplexing the plurality of wireless devices 22 for PUR transmission.

According to this aspect, in some embodiments, the network node 16 is further configured to indicate, via the processing circuitry 68, the starting subframe for the configured PUR. In some embodiments, the one or more multiplexing criteria includes determining, via the processing circuitry 68, the transmission length and periodicity of the PUR transmission for each wireless device 22 of the plurality of wireless devices, grouping two or more of the wireless devices 22 having PUR periodicities that are either the same periodicity or are different with each periodicity being a multiple of another periodicity, and allocating, via the processing circuitry 68, a unique starting subframe for a PUR transmission for each wireless device 22 in the group of two or more wireless devices. In some embodiments, the network node 16 is further configured to configure, via the processing circuitry 68, the group of two or more wireless devices 22 on a subset of frequency resources. In some embodiments, the one or more multiplexing criteria includes determining the transmission length and periodicity of a PUR transmission for each wireless device 22 of the plurality of wireless devices 22, grouping two or more of the wireless devices 22 having the same PUR transmission length and PUR periodicity, and allocating the group of one or more wireless devices 22 to the same multi user multiple input multiple output, MU-MIMO, beam or radio resources. In some embodiments, the wireless device configured PUR has a periodicity derived from a set of PUR periodicities used by the network node 16 which are multiples of a smallest PUR period. In some embodiments, the wireless device configured PUR has a periodicity derived from a set of PUR periodicities used by the network node, the set of PUR periodicities occupying $2^n$ subframes, where n is an integer greater than 1. In some embodiments, the network node 16 is further configured to provide hyperframe cycle information in a configuration of the PUR periodicity. In some embodiments, a PUR transmission length is a number of repetitions times a number of resource units. In some embodiments, the network node 16 is further configured, via processing circuitry 68, to multiplex scheduling of wireless devices 22 that are configured with the same PUR transmission lengths and same PUR periods. In some embodiments, the network node 16 is further configured to multiplex scheduling of wireless devices 22 that are configured with different PUR transmission lengths but with same PUR periods. In some embodiments, the network node 16 is further configured to multiplex, via processing circuitry 68, scheduling of wireless devices 22 that are configured with same PUR transmission lengths but with different PUR periods. In some embodiments, the network node 16 is further configured to multiplex, via the processing circuitry 68, scheduling of wireless devices 22 that are configured with different PUR transmission lengths and with different PUR periods.

According to another aspect, a method performed by a network node 16 for scheduling a plurality of wireless devices includes configuring a wireless device 22 of the plurality of wireless devices 22 with preconfigured uplink resources, PURs, the PURs having a transmission length and a periodicity, the PURs being configured based at least in part on one or more multiplexing criteria for multiplexing the plurality of wireless devices for PUR transmission.

According to this aspect, in some embodiments, the method further includes indicating, via the processing circuitry 68, the starting subframe for the configured PUR. In some embodiments, the one or more multiplexing criteria comprises: determining the transmission length and periodicity of the PUR transmission for each wireless device 22 of the plurality of wireless devices 22, grouping two or more of the wireless devices 22 having PUR periodicities that are either the same periodicity or are different with each periodicity being a multiple of another periodicity, and allocating, via processing circuitry 68, a unique starting subframe for a PUR transmission for each wireless device 22 in the group of two or more wireless devices 22. In some embodiments, the network node 16 is further configured to configure the group of two or more wireless devices 22 on a subset of frequency resources. In some embodiments, the one or more multiplexing criteria comprises: determining the transmission length and periodicity of a PUR transmission for each wireless device 22 of the plurality of wireless devices, grouping two or more of the wireless devices 22 having the same PUR transmission length and PUR periodicity, and allocating the group of one or more wireless devices to the same multi user multiple input multiple output, MU-MIMO, beam or radio resources. In some embodiments, the wireless device configured PUR has a periodicity derived from a set of PUR periodicities used by the network node 16 which are multiples of a smallest PUR period. In some embodiments, the wireless device configured PUR has a periodicity derived from a set of PUR periodicities used by the network node, the set of PUR periodicities occupying $2^n$ subframes, where n is an integer greater than 1. In some embodiments, the network node 16 is further configured to provide, via processing circuitry 68 and radio interface 62, hyperframe cycle information in a configuration of the PUR periodicity. In some embodiments, a PUR transmission length is a number of repetitions times a number of resource units. In some embodiments, the network node 16 is further configured to multiplex, via processing circuitry 68, scheduling of wireless devices 22 that are configured with the same PUR transmission lengths and same PUR periods. In some embodiments, the network node 16 is further configured to multiplex, via processing circuitry 68, scheduling of wireless devices 22 that are configured with different PUR transmission lengths but with same PUR periods. In some embodiments, the network node 16 is further configured to multiplex, via processing circuitry 68, scheduling of wireless devices 22 that are configured with same PUR transmission lengths but with different PUR periods. In some embodiments, the network node 16 is further configured to multiplex, via the processing circuitry 68 scheduling of wireless devices 22 that are configured with different PUR transmission lengths and with different PUR periods.

According to yet another aspect, a wireless device 22 configured to communicate with a network node 16 is provided. The wireless device 22 is configured to: receive, via radio interface 82, an indication of a pre-configured uplink resource, PUR, transmission length, PUR period and PUR start position, configure, via processing circuitry 84, which may include PUSCH configuration unit 34, a PUSCH, transmission according to the indication of the PUR transmission length, PUR period and PUR start position, and transmit on a PUSCH on PURs having the indicated PUR transmission length, PUR period and PUR start position.

According to this aspect, in some embodiments, a length of a PUR period is a multiple of a smallest PUR periodicity. In some embodiments, the wireless device 22 is further configured to receive, via the radio interface 82, hyperframe cycle information in a configuration of the PUR periodicity. In some embodiments, a PUR transmission length is a number of repetitions times a number of resource units.

According to another aspect, a method performed by a wireless device 22 includes: receiving, via radio interface 82, an indication of a PUR transmission length, PUR period and PUR start position, configuring, via the processing circuitry 84, a PUSCH transmission according to the indication of PUR transmission length, PUR period and PUR start position, and transmitting, via the radio interface 82, on a PUSCH on PURs having the indicated PUR duty cycle (transmission length), PUR period and PUR start position.

According to this aspect, in some embodiments, a length of a PUR period is a multiple of a smallest PUR periodicity. In some embodiments, the method includes receiving, via the radio interface 82, hyperframe cycle information in a configuration of the PUR periodicity. In some embodiments, a PUR transmission length is a number of repetitions times a number of resource units.

Some example embodiments include:

Embodiment A1. A network node configured to communicate with a wireless device (WD), the network node configured to, and/or comprising a radio interface and/or comprising processing circuitry configured to:

configure preconfigured uplink resources, PURs, the PURs having a duty cycle, a transmission length and a periodicity for each of a plurality of WDs to be multiplexed;

indicate a starting position of a PUR subframe of a WD, for each of the plurality of WDs; and schedule WD uplink transmissions using the PURs.

Embodiment A2. The network node of Embodiment A1, wherein scheduling of a plurality of WDs includes.

determining the transmission length and periodicity of each WD transmission on the PUR;

grouping WDs having PUR periodicities that are the same or are multiples of one another; and defining a starting subframe for a PUR duty cycle and a transmission length for each WD.

Embodiment A3. The network node of Embodiment A2, wherein grouping WDs having PUR periodicities that are the same or are multiples of one another includes grouping WDs on each of at least one subset of frequency resources.

Embodiment A4. The network node of Embodiment A3, wherein, in case of multi user multiple input multiple output, MU-MIMO, WDs having a same PUR duty cycle, transmission length and periodicity are grouped for using a same beam.

Embodiment A5. The network node of Embodiment A1, wherein numbers in a set of PUR periodicities are multiples of a smallest PUR period.

Embodiment A6. The network node of Embodiment A5, wherein a set of PUR periodicities occupy $2^n$ subframes, where n is an integer greater than 1.

Embodiment A7. The network node of Embodiment A5, wherein a length of PUR period is a multiple of a basic PUR periodicity.

Embodiment A8. The network node of Embodiment A1, further comprising providing hyperframe cycle information in a configuration of the PUR periodicity.

Embodiment A9. The network node of Embodiment A1, wherein a PUR transmission duration is a number of repetitions times a number of resource units.

Embodiment A10. The network node of Embodiment A1, further comprising multiplexing scheduling of WDs that are configured with the same PUR Duty cycles and same PUR periods.

Embodiment A11. The network node of Embodiment A1, further comprising multiplexing scheduling of WDs that are configured with different PUR duty cycles but with same PUR periods.

Embodiment A12. The network node of Embodiment A1, further comprising multiplexing scheduling of WDs that are configured with same PUR duty cycles and different PUR periods.

Embodiment A13. The network node of Embodiment A1, further comprising multiplexing scheduling of WDs that are configured with different PUR duty cycles and different PUR periods.

Embodiment B1. A method implemented in a network node, the method comprising
configuring preconfigured uplink resources, PURs, the PURs having a duty cycle, a transmission length and a periodicity for each of a plurality of WDs whose scheduling are to be multiplexed;
indicating a starting position of a PUR subframe of a WD, for each of the plurality of WDs; and
scheduling WD uplink transmissions using the PURs.

Embodiment B2. The method of Embodiment B1, wherein scheduling of a plurality of WDs includes:
determining the transmission length and periodicity of each WD transmission on the PUR;
grouping WDs having PUR periodicities that are the same or are multiples of one another; and
defining a starting subframe for a PUR duty cycle and a transmission length for each WD.

Embodiment B3. The method of Embodiment B2, wherein grouping WDs having PUR periodicities that are the same or are multiples of one another includes grouping WDs on each of at least one subset of frequency resources.

Embodiment B4. The method of Embodiment B3, wherein, in case of multi user multiple input multiple output, MU-MIMO, WDs having a same PUR duty cycle, transmission length and periodicity are grouped for using a same beam.

Embodiment B5. The method of Embodiment B 1, wherein numbers in a set of PUR periodicities are multiples of a smallest PUR period.

Embodiment B6. The method of Embodiment B5, wherein a set of PUR periodicities occupy $2^n$ subframes, where n is an integer greater than 1.

Embodiment B7. The method of Embodiment B5, wherein a length of PUR period is a multiple of a basic PUR periodicity.

Embodiment B8. The method of Embodiment B1, further comprising providing hyperframe cycle information in a configuration of the PUR periodicity. Embodiment B9. The method of Embodiment B1, wherein a PUR transmission duration is a number of repetitions times a number of resource units.

Embodiment B10. The method of Embodiment B1, further comprising multiplexing scheduling of WDs that are configured with the same PUR Duty cycles and same PUR periods.

Embodiment B11. The method of Embodiment B1, further comprising multiplexing scheduling of WDs that are configured with different PUR duty cycles but with same PUR periods.

Embodiment B12. The method of Embodiment B1, further comprising multiplexing scheduling of WDs that are configured with same PUR duty cycles and different PUR periods.

Embodiment B13. The method of Embodiment B1, further comprising multiplexing scheduling of WDs that are configured with different PUR duty cycles and different PUR periods.

Embodiment C1. A wireless device (WD) configured to communicate with a network node, the WD configured to, and/or comprising a radio interface and/or processing circuitry configured to:
receive an indication of a pre-configured uplink resource, PUR, duty cycle, PUR period and PUR start position; and
transmit on a physical uplink shared channel, PUSCH, on PURs having the indicated PUR duty cycle, PUR period and PUR start position.

Embodiment D1. A method implemented in a wireless device (WD), the method comprising:
receiving an indication of a pre-configured uplink resource, PUR, duty cycle, PUR period and PUR start position; and
transmitting on a physical uplink shared channel, PUSCH, on PURs having the indicated PUR duty cycle, PUR period and PUR start position.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for scheduling a plurality of wireless devices with periodic preconfigured uplink shared channel resources, the network node comprising processing circuitry configured to:
    configure a wireless device of the plurality of wireless devices with a preconfigured uplink resource, PUR, the PUR having a transmission length and a periodicity, the wireless device configured PUR having a periodicity derived from a set of PUR periodicities used by the network node which are multiples of a smallest PUR period;
    the PUR being configured based at least in part on at least one mutliplexing criterion for multiplexing the plurality of wireless devices for PUR transmission, the at least one multiplexing criterion including:
        determining a transmission length and a periodicity of a PUR transmission of each wireless device of the plurality of wireless devices;
        grouping at least two of the wireless devices having PUR periodicities that are different with each periodicity of the at least two of the wireless devices being a multiple of another periodicity; and
        allocating a unique starting subframe for the PUR transmission for each wireless device in the group.

2. The network node of claim 1, wherein the processing circuitry is further configured to configure the group of two or more wireless devices on a subset of frequency resources.

3. The network node of claim 1, wherein the wireless device configured PUR has a periodicity derived from a set of PUR periodicities used by the network node, the set of PUR periodicities occupying $2^n$ subframes, where n is an integer greater than 1.

4. The network node of claim 1, wherein the processing circuitry is further configured to provide hyperframe cycle information in a configuration of the PUR periodicity.

5. The network node of claim 1, wherein a PUR transmission length is a number of repetitions times a number of resource units.

6. A method performed by a network node for scheduling a plurality of wireless devices with periodic preconfigured uplink shared channel resources, the method comprising:
    configuring a wireless device of the plurality of wireless devices with a preconfigured uplink resource, PUR, the PUR having a transmission length and a periodicity, the wireless device configured PUR having a periodicity derived from a set of PUR periodicities used by the network node which are multiples of a smallest PUR period;
    the PUR being configured based at least in part on at least one multiplexing criterion for multiplexing the plurality of wireless devices for PUR transmission, the at least one multiplexing criterion including:
        determining a transmission length and a periodicity of a PUR transmission of each wireless device of the plurality of wireless devices;
        grouping at least two of the wireless devices having PUR periodicities that are different with each periodicity of the at least two of the wireless devices being a multiple of another periodicity; and
        allocating a unique starting subframe for the PUR transmission for each wireless device in the group.

7. The method of claim 6, further comprising configuring the group of two or more wireless devices on a subset of frequency resources.

8. The method of claim 6, wherein the wireless device configured PUR has a periodicity derived from a set of PUR periodicities used by the network node, the set of PUR periodicities occupying $2^n$ subframes, where n is an integer greater than 1.

9. The method of claim 6, further comprising providing hyperframe cycle information in a configuration of the PUR periodicity.

10. The method of claim 6, wherein a PUR transmission length is determined by a number-of-repetitions times a number of resource units.

11. A wireless device configured to communicate with a network node, the wireless device comprising processing circuitry configured to:
   receive an indication of a pre-configured uplink resource, PUR, the PUR having a PUR transmission length, PUR period and PUR start position;
   the PUR being configured based at least in part on at least one multiplexing criterion for multiplexing a plurality of wireless devices, including the wireless device, for PUR transmission, the at least one multiplexing criterion including:
      a determination of a transmission length and a periodicity of a PUR transmission of each wireless device of the plurality of wireless devices;
      a grouping of at least two of the wireless devices having PUR periodicities that are different with each periodicity of the at least two of the wireless devices being a multiple of another periodicity; and
      an allocation of a unique starting subframe for the PUR transmission for each wireless device in the group;
   transmit an uplink transmission using the PUR in accordance with the indicated PUR transmission length, PUR period and PUR start position; and
   a length of the PUR period being a multiple of a smallest PUR periodicity.

12. The wireless device of claim 11, wherein the processing circuitry is further configured to receive hyperframe cycle information in a configuration of the PUR periodicity.

13. The wireless device of claim 11, wherein a PUR transmission length is a number-of-repetitions times a number of resource units.

14. A method performed by a wireless device, the method comprising:
   receiving an indication of a pre-configured uplink resource, PUR, the PUR having a PUR transmission length, PUR period and PUR start position;
   the PUR being configured based at least in part on at least one multiplexing criterion for multiplexing a plurality of wireless devices, including the wireless device, for PUR transmission, the at least one multiplexing criterion including:
      a determination of a transmission length and a periodicity of a PUR transmission of each wireless device of the plurality of wireless devices;
      a grouping of at least two of the wireless devices having PUR periodicities that are different with each periodicity of the at least two of the wireless devices being a multiple of another periodicity; and
      an allocation of a unique starting subframe for the PUR transmission for each wireless device in the group;
   transmitting an uplink transmission using the PUR in accordance with the indicated PUR duty cycle, PUR period and PUR start position; and a length of a PUR period being a multiple of a smallest PUR periodicity.

15. The method of claim 14, further comprising receiving hyperframe cycle information in a configuration of the PUR periodicity.

16. The method of claim 14, wherein a PUR transmission length is a number of repetitions times a number of resource units.

17. A non-transitory computer storage medium storing a computer program comprising instructions which when executed on one of a computer and processor circuitry cause the one of the computer and processor circuitry to perform a method for scheduling a plurality of wireless devices with periodic preconfigured uplink shared channel resources, the method comprising:
   configuring a wireless device of the plurality of wireless devices with a preconfigured uplink resource, PUR, the PUR having a transmission length and a periodicity, the wireless device configured PUR having a periodicity derived from a set of PUR periodicities used by a network node which are multiples of a smallest PUR period;
   the PUR being configured based at least in part on at least one multiplexing criterion for multiplexing the plurality of wireless devices for PUR transmission, the at least one multiplexing criterion including:
      determining a transmission length and a periodicity of a PUR transmission of each wireless device of the plurality of wireless devices;
      grouping at least two of the wireless devices having PUR periodicities that are different with each periodicity of the at least two of the wireless devices being a multiple of another periodicity; and
      allocating a unique starting subframe for the PUR transmission for each wireless device in the group.

* * * * *